(12) United States Patent
Park et al.

(10) Patent No.: US 10,888,967 B1
(45) Date of Patent: Jan. 12, 2021

(54) TOOL STRIP MARK GENERATOR CAPABLE OF MEASURING APPLIED FORCE AND METHOD OF MEASURING APPLIED FORCE USING THE SAME

(71) Applicant: REPUBLIC OF KOREA(NATIONAL FORENSIC SERVICE DIRECTOR MINISTRY OF PUBLIC ADMINISTRATION AND SECURITY), Wonju-si (KR)

(72) Inventors: Nam Kyu Park, Bucheon-si (KR); Jae Mo Goh, Wonju-si (KR); Jin Pyo Kim, Daejeon (KR); Young Il Seo, Wonju-si (KR); Eun Ah Joo, Yongin-si (KR); Je Hyun Lee, Wonju-si (KR); Sang Yoon Lee, Wonju-si (KR); Dong A Lim, Daejeon (KR); Kyung Mi Kim, Namyangju-si (KR)

(73) Assignee: REPUBLIC OF KOREA (NATIONAL FORENSIC SERVICE DIRECTOR MINISTRY OF PUBLIC ADMINISTRATION AND SECURITY), Wonju-si (KR)

( * ) Notice: Subject to any disclaimer, the term of this patent is extended or adjusted under 35 U.S.C. 154(b) by 0 days.

(21) Appl. No.: 16/689,489

(22) Filed: Nov. 20, 2019

(30) Foreign Application Priority Data

Jul. 3, 2019 (KR) ........................ 10-2019-0080085

(51) Int. Cl.
*B23Q 17/09* (2006.01)
*G01L 5/00* (2006.01)
(Continued)

(52) U.S. Cl.
CPC .......... *B23Q 17/099* (2013.01); *B23Q 17/09* (2013.01); *G01L 5/0052* (2013.01); *G01L 5/107* (2013.01);
(Continued)

(58) Field of Classification Search
CPC .. G06K 2209/19; G06K 2209/40; G06K 9/00; G06K 9/00986; G06K 9/6202;
(Continued)

(56) References Cited

U.S. PATENT DOCUMENTS 10,697,899 B1 * 6/2020 Park ........................ G06N 20/00
2006/0047477 A1 * 3/2006 Bachrach ................ F42B 35/00
702/182

(Continued)

FOREIGN PATENT DOCUMENTS

CN 201133812 Y * 10/2008 ............. G01N 19/02
KR 10-1885066 B1 8/2018

OTHER PUBLICATIONS

Petraco et al. "Application of Machine Learning to Toolmakrs: Statistically Based Methods for Impression Pattern Comparison", Dec. 2011. <https://www.ncjrs.gov/pdffiles1/nij/grants/239048.pdf> (Year: 2011).*

(Continued)

*Primary Examiner* — Jonathan M Dunlap
(74) *Attorney, Agent, or Firm* — Hauptman Ham, LLP

(57) ABSTRACT

A tool strip mark generator capable of measuring applied force includes: a bottom surface on which at least a portion of a target surface made of a material capable of generating a tool strip mark, which is a tool-scraped stripe, is formed; a rotating member configured to be rotatable in a state of being spaced apart from the bottom surface; a moving member movable on the bottom surface by laterally coupling the rotating member to a coupling portion; a force
(Continued)

sensor attached to one side of an outer peripheral surface of the rotating member and sensing force which is applied when a tool strip mark is generated on the target surface by inserting the tool; a measurer configured to measure an output signal of the force sensor and calculate information about the applied force; and a display configured to display information about the applied force calculated by the measurer.

7 Claims, 7 Drawing Sheets

(51) Int. Cl.
    *G01L 5/107*     (2020.01)
    *G01N 21/88*     (2006.01)
    *G01N 21/956*     (2006.01)

(52) U.S. Cl.
    CPC ..... *G01N 21/8806* (2013.01); *G01N 21/8851* (2013.01); *G01N 21/956* (2013.01)

(58) Field of Classification Search
    CPC .. G06K 9/6215; G06K 9/6247; G06K 9/6249; G06K 9/6255; G06K 9/6256; G01N 21/8851; G01N 21/8806; G01N 21/9501; G01N 21/956; G01N 2021/8848; G01N 2021/8887; G06T 7/0004; G06T 2207/10028; G06T 2207/10056; G06T 2207/10152; G06T 2207/20056; G06T 2207/20076; G06T 2207/30136; G06T 2207/30164; G06T 2200/04
    See application file for complete search history.

(56) References Cited

U.S. PATENT DOCUMENTS

| | | | |
|---|---|---|---|
| 2006/0150710 A1* | 7/2006 | Moyse | G01N 19/02 73/7 |
| 2011/0311107 A1* | 12/2011 | Levesque | G01B 11/24 382/106 |
| 2019/0026595 A1* | 1/2019 | Seo | G06F 3/147 |

OTHER PUBLICATIONS

Zheng et al. "2D/3D Topography Comparisons of 10 Consecutively Manufactured Chisels and Punches . . .Function" Nist, Feb. 2014, <https://www.nist.gov/system/files/documents/forensics/2D_3D_Topography_Comparisons_of_Toolmarks_Generated_by_Consecutively_Manufactured_Chisels_and_Punches_FINAL.pdf> (Year: 2014).*

[Supportive Materials for Exception to Loss of Novelty] Je Hyun Lee, "Statistical analysis of tool trace identity and machine learning judgment", The 35th Korean Society of Forensic Sciences 2018 Fall Conference, Nov. 30, 2018, The Korean Society of Forensic Sciences, Republic of Korea.

Korean Office Action for corresponding Korean application No. 10-2019-0080085 dated May 14, 2020, citing the below references.

Xiaoyu Alan Zheng et al., 2D and 3D Topography Comparisons of Toolmarks Produced from Consecutively Manufactured Chisels and Punches, AFTE Journal, Dec. 31, 2014, pp. 143-147, vol. 46, No. 2, cited in NPL No. 1.

Martin Baiker et al, Toolmark variability and quality depending on the fundamental parameters: Angle of attack, toolmark depth and substrate material, Forensic Science International, Mar. 18, 2015, vol. 251, pp. 40-49, cited in NPL No. 1.

* cited by examiner (a)

(b)

(a)

(b)

TOOL STRIP MARK GENERATOR CAPABLE OF MEASURING APPLIED FORCE AND METHOD OF MEASURING APPLIED FORCE USING THE SAME

CROSS-REFERENCE TO RELATED APPLICATION

This application claims the benefit of Korean Patent Application No. 10-2019-0080085, filed on Jul. 3, 2019, in the Korean Intellectual Property Office, the disclosure of which is incorporated herein in its entirety by reference.

BACKGROUND

1. Field

One or more embodiments relate to a tool strip mark generator capable of measuring applied force and a method of measuring the applied force using the tool strip mark generator.

2. Description of the Related Art

Tool marks are marks formed by mutual contact of objects. The tool marks may be divided into cuts, impression, scratches, abrasion, striations, friction, and the like. When a screwdriver scratches the surface of an object or a lever is used to open the door, marks are left on the door trim. When cutting the object with a cutter, tool marks showing characteristics of the tool remain.

In a crime scene involving theft or explosives, analyzing which tools opened the vault, made explosives, etc., plays an important role in the investigation. Depending on whether the tool is a cutting tool or a crimping tool, or whether the tool is double-edged or single-edged, specific tool marks are left. These tool marks may be used to analyze which tool was used. In this way, tool marks in criminal cases play an important role in solving crime cases because it is possible to estimate criminal tools and actors from the tool marks.

When a tool suspected of being used by a suspect is found in a crime scene, the crime scene is reconstructed and tool marks are generated with the suspicious tool. By comparing features of the generated tool marks and tool marks taken from evidences found in the crime scene, it is possible to determine whether they are identical or not. When the generated tool marks are found to be identical to the tool marks taken from the evidences found at the crime scene, the suspect in the case is proved to have committed the crime using the tool. Determining whether or not the generated tool marks are the same as the tool marks found at the crime scene, it plays an important role in resolving the crime. Therefore, there is a continuing study on the determination of the identity of such tool marks.

[Prior art document] Korean Patent No. 10-1885066 (registered on Jul. 30, 2018)

SUMMARY

One or more embodiments include a tool strip mark generator capable of measuring applied force when generating a tool strip mark and performing research and analysis of the tool strip mark, and a method of measuring the applied force using the tool strip mark generator.

According to one or more embodiments, a tool strip mark generator capable of measuring applied force includes: a bottom surface on which at least a portion of a target surface is made of a material capable of generating a tool strip mark, which is a tool-scraped stripe, is formed; a rotating member configured to be rotatable in a state of being spaced apart from the bottom surface by a set rotation angle with respect to a rotation axis on a virtual plane spaced apart from the bottom surface by a certain distance; a moving member movable on the bottom surface at a set moving speed by laterally coupling the rotating member to a coupling portion spaced apart from the bottom surface by a certain distance so as to be rotatable; a force sensor attached to one side of an outer peripheral surface of the rotating member and sensing force which is applied when a tool strip mark is generated on the target surface by inserting the tool; a measurer for measuring an output signal of the force sensor and calculating information about the applied force; and a display for displaying information about the applied force calculated by the measurer.

Here, the moving member may be formed as a pair such that both ends of the rotating member are coupled to each other so that the rotating member may rotate at a set rotation angle.

Here, the bottom surface may further include a rail for allowing the moving member to move forward or backward.

Here, the tool strip mark generator may further include a controller capable of adjusting a rotation angle of the rotating member according to the set rotation angle of the rotating member by a user's input.

Here, the controller may further adjust a moving speed of the moving member according to the set moving speed of the moving member by the user's input.

Here, information about the applied force may include at least one of a measured value of the applied force, a measured value of the applied force according to a change in the set rotation angle of the rotating member, and a measured value of the force according to a change in the set moving speed of the moving member.

According to one or more embodiments, a method of measuring applied force using a tool strip mark generator capable of measuring applied force includes: generating a tool strip mark on a target surface by inserting a tool into a force sensor attached to an outer peripheral surface of a rotating member which is coupled to a moving member moving at a set moving speed and moves at a set rotation angle, and by rotating the moving member at the set rotation angle and moving the moving member at the set moving speed; and measuring force which is applied when the tool strip mark is generated on the target surface.

Additional aspects will be set forth in part in the description which follows and, in part, will be apparent from the description, or may be learned by practice of the presented embodiments.

According to an embodiment, it is possible to measure applied force when a tool strip mark is generated, and more accurately perform research and analysis of the tool strip mark. In addition, by researching and analyzing the tool strip mark generated with the applied force, it is determined whether or not the tool strip mark and a tool strip mark found at the crime scene is the same to help solve the crime case.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
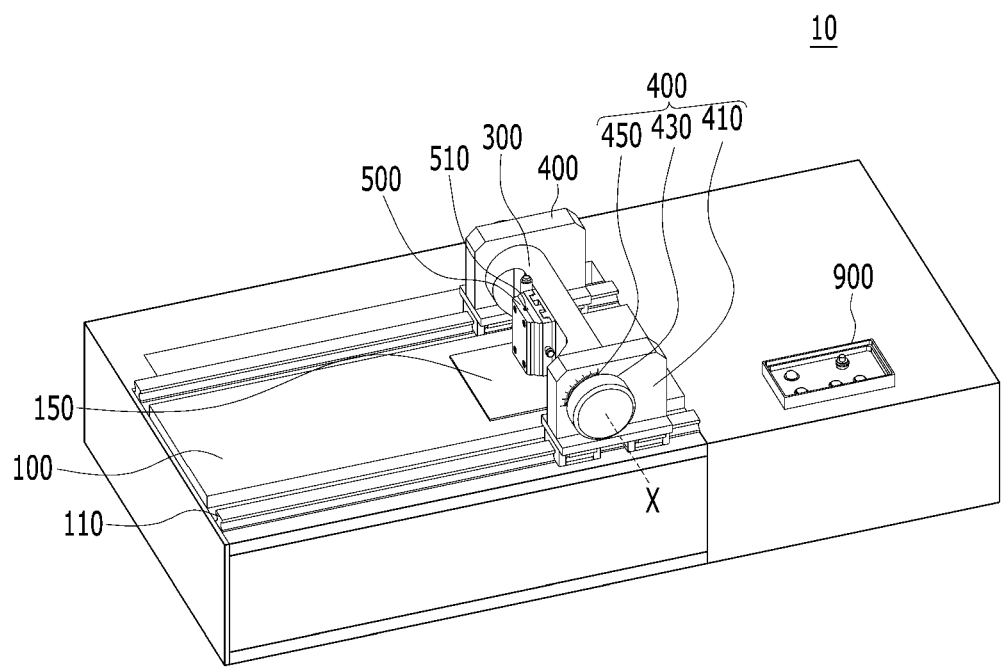
FIG. 1 is a view of a tool strip mark generator capable of measuring applied force according to an embodiment.

Hereinafter, embodiments of the disclosure will be described in detail with reference to the accompanying drawings. The same reference numerals are used to denote the same elements, and repeated descriptions thereof will be omitted.

It will be understood that although the terms "first", "second", etc. may be used herein to describe various components, these components should not be limited by these terms.

An expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of components in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

It will be understood that when a layer, region, or component is connected to another portion, the layer, region, or component may be directly connected to the portion or an intervening layer, region, or component may exist. For example, when a layer, region, or component is electrically connected to another portion, the layer, region, or component may be directly electrically connected to the portion or may be indirectly connected to the portion through another layer, region, or component.

Hereinafter, a tool strip mark generator capable of measuring applied force 10 according to an embodiment will be described with reference to FIGS. 1 to 4.

Figure 2:
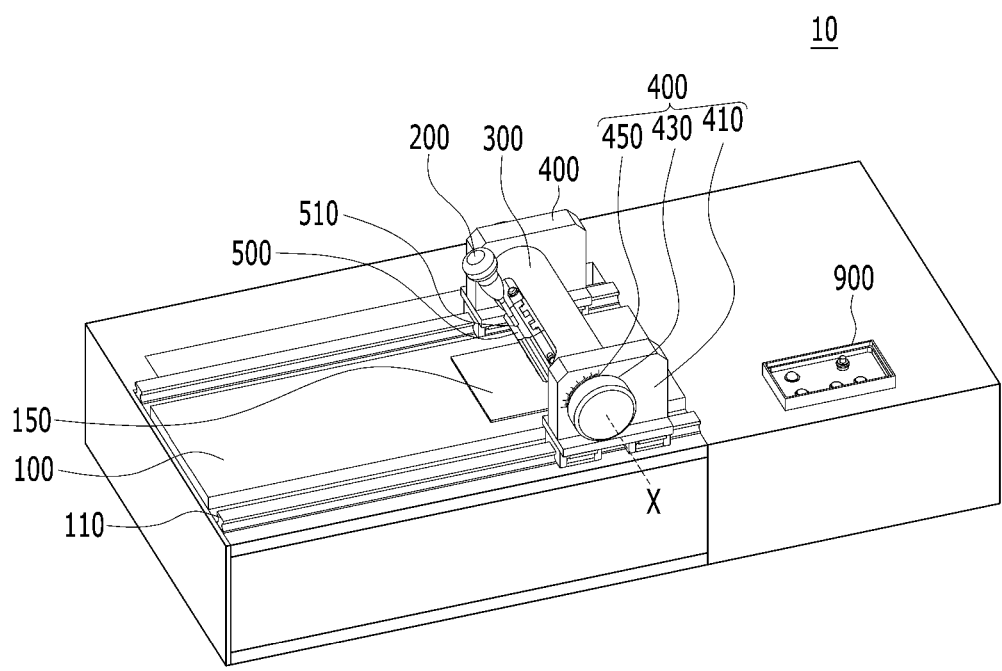
FIG. 2 is a view of a state in which a tool is inserted in FIG. 1.
Figure 3:
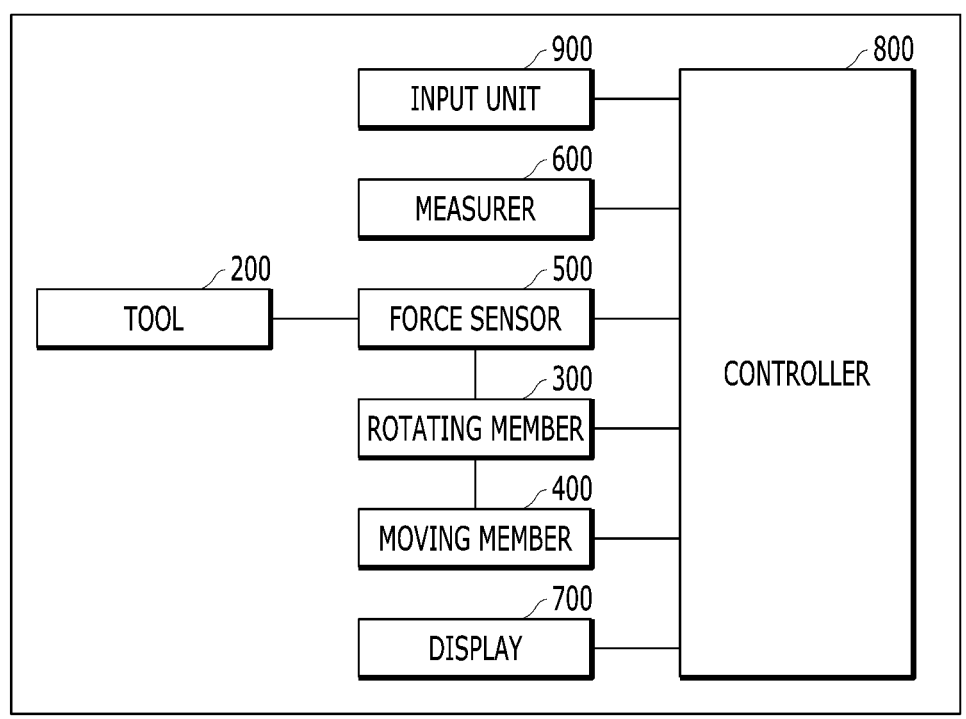
FIG. 3 is a block diagram of a tool strip mark generator capable of measuring applied force according to an embodiment.
Figure 4:
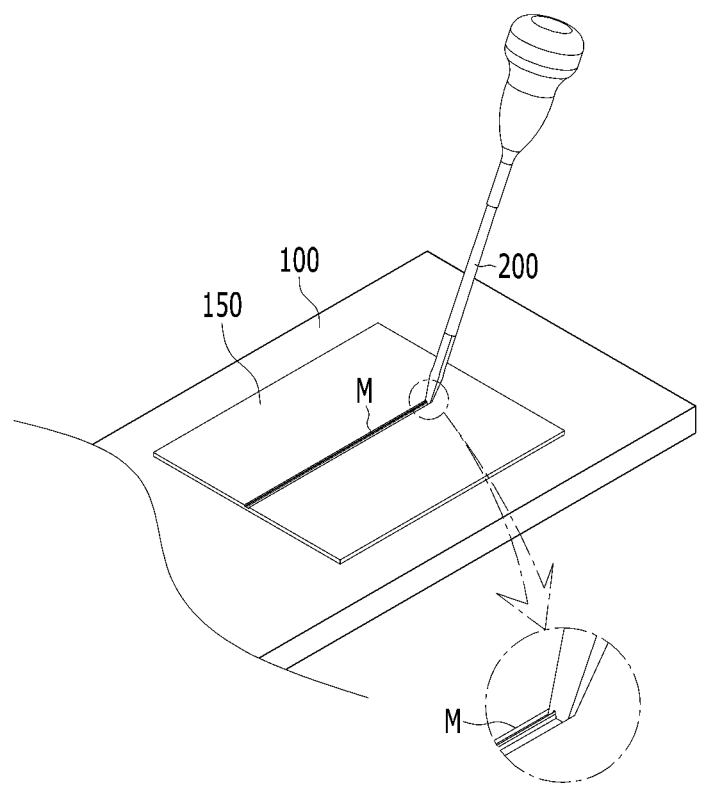
FIG. 4 is a view of a tool strip mark formed according to an embodiment.

FIG. 1 is a view of the tool strip mark generator capable of measuring applied force 10 according to an embodiment, and FIG. 2 is a view of a state in which a tool is inserted in FIG. 1. FIG. 3 is a block diagram of the tool strip mark generator capable of measuring applied force 10 according to an embodiment. FIG. 4 is a view of a tool strip mark formed according to an embodiment.

A bottom surface 100 may be formed with a target surface 150. The target surface 150 may be made of a material capable of generating a strip mark M of a tool 200, which is a tool-scraped stripe. The target surface 150 may also be formed on at least a portion of the bottom surface 100 on which the strip mark M of the tool 200 may be generated. Any material may be used as long as the target surface 150 is made of a material capable of generating the strip mark M of the tool 200. For example, the material of the target surface 150 may be beeswax, in which the strip mark M of the tool 200 is easily formed.

Meanwhile, the bottom surface 100 may be installed anywhere on a horizontal plane.

The bottom surface 100 may include a rail 110. The rail 110 allows the moving member 400, which will be described later below, to move forward or backward.

The tool 200 may be any one that generates the strip mark M on the target surface 150 formed on the bottom surface 100. For example, the tool 200 may be a flat screwdriver as shown. The flat screwdriver includes a steel body and a handle formed of plastic or wood, and one end of the body is formed in a flat shape. When one end of the body formed in the flat shape of the flat screwdriver is scratched against the target surface 150, the strip mark M indicating characteristics of the shape of the flat screwdriver may be generated.

A rotating member 300 may be formed to be rotatable in a state where the rotating member 300 is spaced apart from the bottom surface 100 at a set rotation angle with respect to a rotation axis X. Here, the rotation axis X of the rotating member 300 may be placed on a virtual plane spaced apart from the bottom surface 100 by a certain distance. For example, the rotation axis X may be on a virtual plane parallel to the bottom surface 100, and the rotation axis X may be parallel to the bottom surface 100.

The moving member 400 may be moved on the bottom surface 100 at a set moving speed by coupling the rotating member 300 on the side. The moving member 400 may include a body portion 410 and a coupling portion 430 and may further include a wheel portion (not shown) and an angle display portion 450.

The body portion 410 allows the rotating member 300 to be coupled and supported on the side. The body 410 may have any shape as long as it can be supported on the bottom surface 100 in a state of being coupled to the rotating member 300 having certain weight and volume. As shown in the drawings, the body 410 may be formed in a plate shape.

The coupling portion 430 may be spaced apart from the bottom surface 100 by a certain distance to couple the rotating member 300 on the side. The rotating member 300 coupled to the coupling portion 430 may be formed to be rotatable in a state where the rotating member 300 is spaced apart from the bottom surface 100 at a rotation angle within a set range with respect to the rotation axis X. For example, a thread is formed on an outer peripheral surface of the rotating member 300 and another thread is formed on an inner peripheral surface of the coupling portion 430. The threads of the outer peripheral surface of the rotating member 300 and the inner peripheral surface of the coupling portion 430 are coupled and rotated to rotate the rotating member 300 so that the rotating member 300 may be changed to a set rotation angle.

The coupling portion 430 may be formed on a side surface of the moving member 400. Here, the coupling portion 430 may be formed in a through-hole shape so as to penetrate both sides of the moving member 400, allowing the rotating member 300 to pass through the both sides of the moving member 400. When the coupling portion 430 is formed in the through-hole shape, the rotating member 300 may be rotated at the set rotation angle in a state where the rotating member 300 passes through the both sides of the moving member 400. Also, even when the coupling portion 430 is formed in the through-hole shape, the rotating member 300 may be rotated at the set rotation angle without penetrating the both sides of the moving member 400 in a state where the rotating member 300 is coupled to only one side of the moving member 400. Meanwhile, the coupling portion 430 may be formed in a groove shape on one side of the moving member 400. The rotating member 300 may be coupled to only one side of the moving member 400 and rotate at the set rotation angle.

The wheel portion may be formed at a lower end of the moving member 400 so that the moving member 400 may move on the bottom surface 100. When the rail 110 is included in the bottom surface 100, the wheel portion may be formed such that the moving member 400 may move along the rail 110.

The angle display portion 450 is formed on the side where the rotating member 300 and the moving member 400 are coupled to each other to confirm an angle at which the rotating member 300 rotates. The angle display portion 450 may be formed on an inner surface where the rotating member 300 and the moving member 400 are coupled. Furthermore, when the coupling portion 430 is formed in the through-hole shape, the angle display portion 450 may also be formed on an outer surface of the moving member 400 through which the rotating member 300 passes.

The moving member 400 may be formed as a pair such that both ends of the rotating member 300 are coupled to each other so that the rotating member 300 may rotate at a set rotation angle. When the moving member 400 is formed as a pair, the moving member 400 is respectively coupled to both ends of the rotating member 300 to provide stability of movement so that the moving member 400 may move without shaking when the moving member 400 moves.

The force sensor 500 may sense force which is applied when the strip mark M of the tool 200 is generated on the target surface 150 by inserting the tool 200. The force sensor 500 is attached to one side of the outer peripheral surface of the rotating member 300 and may measure the force which is applied when the strip mark M of the tool 200 is generated on the target surface 150 by inserting the tool 200.

The force sensor 500 may be, for example, a load cell. The load cell is a sensor that converts force into a measurable output signal. When the force sensor 500 is a load cell, a strain gauge or a piezoelectric element is built in a surface where the tool 200 inserted into a formed tool insertion port 510 abuts against the force sensor 500. Accordingly, the force sensor 500 may sense the force which is applied when the strip mark M of the tool 200 is generated on the target surface 150. Therefore, the force sensor 500 may output the force which is applied when the strip mark M of the tool 200 is generated on the target surface 150, by inserting the tool 200, as an output signal.

A measurer 600 may measure the output signal of the force sensor 500 and calculate information about the applied force. The information about the applied force may include at least one of a measured value of the applied force, a measured value of the applied force in accordance with a set rotation angle of the rotating member 300, and a measured value of the applied force in accordance with a set moving speed of the moving member 400.

A display 700 may display a measured value of the force calculated by the measurer 600. The display 700 may include at least one of a liquid crystal display, a thin film transistor-liquid crystal display, an organic light-emitting diode, a flexible display, a three-dimensional (3D) display, and an electrophoretic display.

Meanwhile, the tool strip mark generator capable of measuring applied force 10 may further include a controller 800.

The controller 800 may adjust a rotation angle of the rotating member 300 according to a change in the set rotation angle of the rotating member 300 by a user's input.

The controller 800 may further adjust a moving speed of the moving member 400 according to the set moving speed of the moving member 400 by the user's input. That is, the controller 800 may adjust a moving direction and the magnitude of the moving speed of the moving member 400 by the user's input.

The input unit 900 may transmit a selection signal input by a user, for example, a signal input in connection with setting and control, to the controller 800. In addition, the input unit 900 may include at least one of a keypad and a touchpad that generates an input signal according to a user's touch or operation. The input unit 900 may be configured in the form of a single touch panel (or a touch screen) together with the display 700 to simultaneously perform input and display functions.

Meanwhile, the user may input the set rotation angle of the rotating member 300 through an input unit 900. The user may input the set moving speed of the moving member 400 through the input unit 900. The controller 800 may adjust the rotation angle of the rotating member 300 and the moving speed of the moving member 400 according to the set rotation angle of the rotating member 300 and the set moving speed of the moving member 400 by the user's input.

An operation of the tool strip mark generator capable of measuring applied force 10 will be described with reference to FIGS. 5 and 6.

Figure 5:
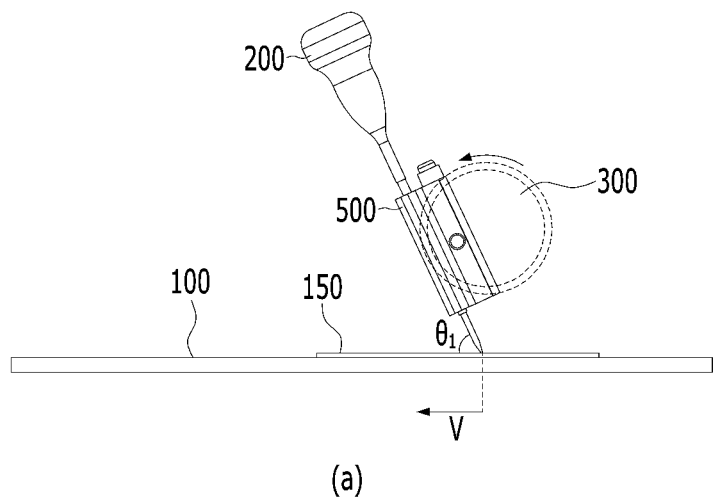
FIGS. 5 and 6 are side views of a use state of a tool strip mark generator capable of measuring applied force according to an embodiment.
Figure 5:
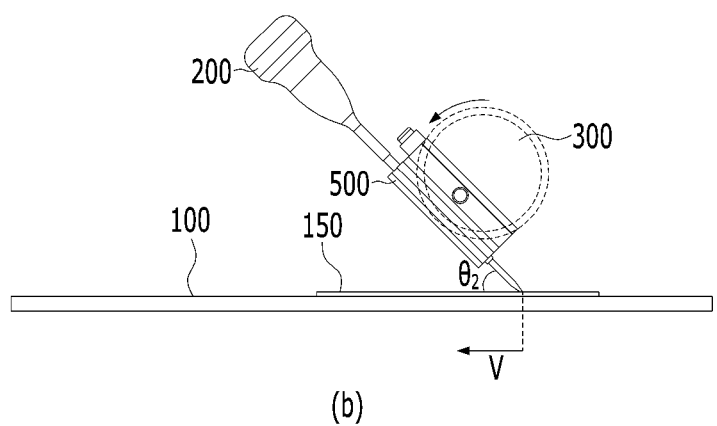
Figure 6:
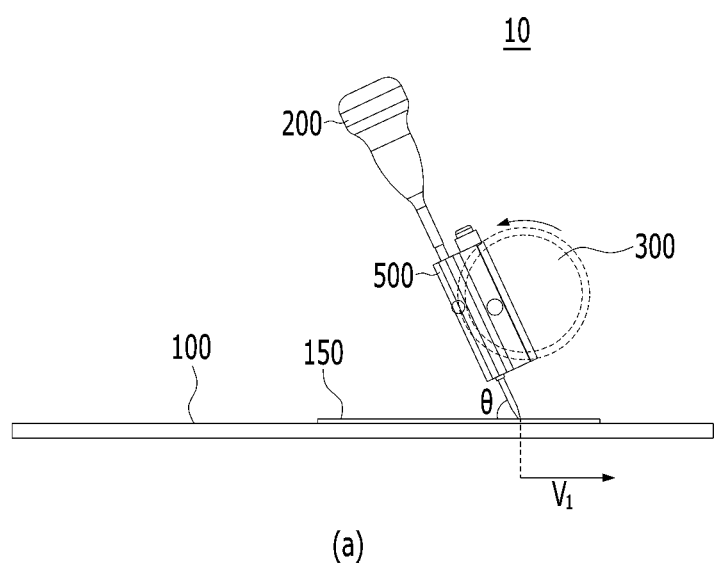
Figure 6:
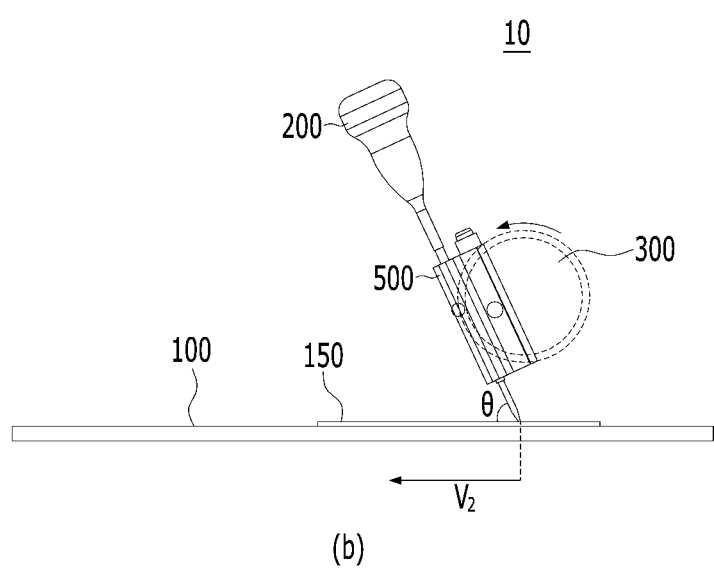

FIGS. 5 and 6 are side views of a use state of the tool strip mark generator capable of measuring the applied force according to an embodiment.

Referring to (a) and (b) in FIG. 5, the tool 200 is inserted through the tool insertion port 510 of the force sensor 500, and one end of the tool 200 is brought into contact with the target surface 150. Therefore, the tool 200 may be rotated at a rotation angle set to an angle of $\theta_1$ with the target surface 150. When the moving member 400 is moved at a set moving speed V while the tool 200 is inserted and maintains the angle of $\theta_1$ with the target surface 150, certain force may be applied to the target surface 150 when the tool 200 scrapes the target surface 150 to generate the strip mark M of the tool 200 as shown in FIG. 4 on the target surface 150. Here, when the moving member 400 is moved at the set moving speed V by changing the set rotation angle of the rotating member 300 to an angle of $\theta_2$ with the target surface 150, the force which is applied when the strip mark M of the tool 200 is generated on the target surface 150 may vary. The force which is applied when the strip mark M of the tool 200 is generated on the target surface 150 may be changed, by inserting the tool 200, in accordance with the change in the set rotation angle of the rotating member 300. A change in the strip mark M of the tool 200 on the target surface 150 may be observed in accordance with the change in the force which is applied when the strip mark M of the tool 200 is generated on the target surface 150.

Referring to (a) and (b) in FIG. 6, the tool 200 is inserted through the tool insertion port 510 of the force sensor 500, and one end of the tool 200 is brought into contact with the target surface 150. Therefore, the tool 200 may be rotated at a rotation angle set to an angle of θ with the target surface 150. When the moving member 400 is moved at a set moving speed $V_1$ while the tool 200 is inserted and maintains the angle of θ with the target surface 150, certain force may be applied to the target surface 150 when the tool 200 scrapes on the target surface 150 to generate the strip mark M of the tool 200 as shown in FIG. 4 on the target surface 150. When the moving member 400 is moved by changing the set moving speed of the moving member 400 to $V_2$ while the tool 200 is inserted and maintains the set rotation angle of θ with the target surface 150, the force which is applied when the strip mark M of the tool 200 is generated on the target surface 150 may change. The force which is applied when the strip mark M of the tool 200 is generated on the target surface 150 may be changed, by inserting the tool 200, in accordance with the change in the set moving speed of the moving member 400. A change in the strip mark M of the tool 200 on the target surface 150 may be observed in accordance with the change in the force which is applied when the strip mark M of the tool 200 is generated on the target surface 150.

As such, certain force may be applied when the strip mark M of the tool 200 is generated on the target surface 150 according to the set rotation angle of the rotating member 300 and the set moving speed of the moving member 400. Therefore, the force which is applied when the strip mark M of the tool 200 is generated may be changed by a change in the set rotation angle of the rotating member 300 and the set moving speed of the moving member 400, and the like. A change in the strip mark M of the tool 200 on the target surface 150 may be observed in accordance with the change in the force which is applied when the strip mark M of the tool 200 is generated on the target surface 150.

Figure 7:
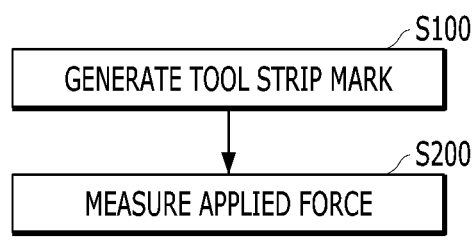
FIG. 7 is a flowchart illustrating a method of measuring applied force using a tool strip mark generator capable of measuring applied force according to an embodiment.

A method of measuring applied force using the tool strip mark generator capable of measuring applied force 10 according to an embodiment will be described with reference to FIG. 7. FIG. 7 is a flowchart illustrating the method of measuring the applied force using the tool strip mark generator capable of measuring applied force 10 according to an embodiment.

In operation S100, the tool 200 is inserted into the force sensor 500 attached to the outer peripheral surface of the rotating member 300 coupled to the moving member 400 moving at a set moving speed and rotating at a set rotation angle, and the moving member is moved at a set moving speed to generate the strip mark M of the tool 200 on the target surface 150.

In operation S200, force which is applied when the strip mark M of the tool 200 is generated on the target surface 150 is measured. The strip mark M of the tool 200 is generated on the target surface 150 and the applied force is measured by the tool strip mark generator capable of measuring applied force 10. Therefore, a relationship between the strip mark M of the tool 200 and the applied force may be clarified so that the strip mark M of the tool 200 may be more accurately researched and analyzed.

It should be understood that embodiments described herein should be considered in a descriptive sense only and not for purposes of limitation. Descriptions of features or aspects within each embodiment should typically be considered as available for other similar features or aspects in other embodiments. Therefore, the scope of the disclosure is defined by the appended claims.

As described above, according the tool strip mark generator capable of measuring applied force 10 according to embodiments and the method of measuring the applied force using the tool strip mark generator capable of measuring applied force 10, the applied force when a tool strip mark is generated is measured so that the tool strip mark may be more accurately researched and analyzed. Furthermore, according to the embodiments, by researching and analyzing the tool strip mark generated with the applied force by the tool strip mark generator capable of measuring applied force 10, it is possible to precisely determine whether or not tool strip marks are the same to help solve the crime case.

What is claimed is:

1. A tool strip mark generator capable of measuring applied force, the tool strip mark generator comprising:
    a bottom surface on which at least a portion of a target surface made of a material capable of generating a tool strip mark, which is a tool-scraped stripe, is formed;
    a rotating member configured to be rotatable in a state of being spaced apart from the bottom surface by a set rotation angle with respect to a rotation axis on a virtual plane spaced apart from the bottom surface by a certain distance;
    a moving member movable on the bottom surface at a set moving speed by laterally coupling the rotating member to a coupling portion spaced apart from the bottom surface by a certain distance so as to be rotatable;
    a force sensor attached to one side of an outer peripheral surface of the rotating member and sensing force which is applied when a tool strip mark is generated on the target surface by inserting the tool;
    a measurer configured to measure an output signal of the force sensor and calculate information about the applied force; and
    a display configured to display information about the applied force calculated by the measurer.

2. The tool strip mark generator of claim 1, wherein the moving member formed as a pair such that both ends of the rotating member are coupled to each other so that the rotating member may rotate at a set rotation angle.

3. The tool strip mark generator of claim 1, wherein the bottom surface further comprises a rail for allowing the moving member to move forward or backward.

4. The tool strip mark generator of claim 1, further comprising:
    a controller capable of adjusting a rotation angle of the rotating member according to the set rotation angle of the rotating member by a user's input.

5. The tool strip mark generator of claim 4, wherein the controller further adjusts a moving speed of the moving member according to the set moving speed of the moving member by the user's input.

6. The tool strip mark generator of claim 1, wherein information about the applied force comprises at least one of a measured value of the applied force, a measured value of the applied force according to a change in the set rotation angle of the rotating member, and a measured value of the force according to a change in the set moving speed of the moving member.

7. A method of measuring applied force using a tool strip mark generator capable of measuring applied force, the method comprising:
    generating a tool strip mark on a target surface by inserting a tool into a force sensor attached to an outer peripheral surface of a rotating member which is coupled to a moving member moving at a set moving speed and moves at a set rotation angle, and by rotating the moving member at the set rotation angle and moving the moving member at the set moving speed; and measuring force which is applied when the tool strip mark is generated on the target surface.

* * * * *